(12) United States Patent
Fischer et al.

(10) Patent No.: US 11,283,469 B2
(45) Date of Patent: Mar. 22, 2022

(54) INTEGRATED CIRCUIT

(71) Applicant: Infineon Technologies AG, Neubiberg (DE)

(72) Inventors: Wieland Fischer, Munich (DE); Bernd Meyer, Munich (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 17/103,969

(22) Filed: Nov. 25, 2020

(65) Prior Publication Data

US 2021/0159918 A1  May 27, 2021

(30) Foreign Application Priority Data

Nov. 27, 2019 (DE) ................. 102019132153.0

(51) Int. Cl.
*H03M 13/15* (2006.01)

(52) U.S. Cl.
CPC ..... *H03M 13/1585* (2013.01); *H03M 13/152* (2013.01); *H03M 13/158* (2013.01); *H03M 13/1515* (2013.01)

(58) Field of Classification Search
None
See application file for complete search history.

(56) References Cited

U.S. PATENT DOCUMENTS

| 10,657,001 B2 * | 5/2020 | Han .................. G06F 11/1446 |
| 2008/0215956 A1 | 9/2008 | Williamson et al. |
| 2012/0079462 A1 * | 3/2012 | Hriljac .................. G06F 8/51 717/136 |
| 2013/0097431 A1 * | 4/2013 | Hriljac .................. G06F 8/52 713/189 |
| 2015/0347231 A1 | 12/2015 | Gopal et al. |

OTHER PUBLICATIONS

Office Action issued for the corresponding German Application No. 102019132153.0 dated Sep. 11, 2020, 5 pages (for informationla purposes only).

* cited by examiner

*Primary Examiner* — Phung M Chung
(74) *Attorney, Agent, or Firm* — Viering, Jentschura & Partner mbB (57) ABSTRACT

An integrated circuit for outputting a function value, comprising a pattern matching circuit, configured to compare an input value and multiple transformed versions of the input value with a specified bit pattern, wherein the transformed versions of the input value or the specified bit pattern are created by repeated application of a transformation to the input value or the specified bit pattern, wherein the function is invariant under the transformation or wherein an inverse transformation exists for the transformation, by means of which a change in the function values that is caused by the transformation of the input values can be reversed, a selection circuit configured to select a function value depending on the matching result of the pattern matching circuit and the input value, and an output circuit configured to output a function value for the input value based on the selected function value.

28 Claims, 4 Drawing Sheets

INTEGRATED CIRCUIT

CROSS-REFERENCE TO RELATED APPLICATION

This application claims priority to German Application DE 102019132153.0, filed on Nov. 27, 2019, the entire contents of which are incorporated by reference herein.

TECHNICAL FIELD

Exemplary embodiments relate in general to integrated circuits.

BACKGROUND

Electronic circuits used for security-related applications, such as smart card modules and control processors in automobiles, must be protected against attacks. In particular, it is typically desirable to be able to detect whether data stored in a memory, such as a non-volatile memory, has been manipulated (or contains errors for any other reason), and can be corrected if necessary. Hardware implementations of such functionality that require small chip surface area are desirable.

BRIEF SUMMARY OF INVENTION

According to an exemplary embodiment, an integrated circuit is provided for outputting a function value of a function for an input value for a function, including a pattern matching circuit that is configured to compare the input value and multiple transformed versions of the input value with a specified bit pattern and/or to compare the input value with the bit pattern and multiple transformed versions of the specified bit pattern, wherein the transformed versions of the input value or the specified bit pattern are created by repeated application of a transformation to the input value or the specified bit pattern, wherein the function is invariant under the transformation or wherein an inverse transformation exists for the transformation, by means of which a change in the function values that by the transformation of the input values can be reversed, a selection circuit that is configured to select a function value depending on the matching result of the pattern matching circuit and the input value, and an output circuit that is configured to output a function value for the input value based on the selected function value.

BRIEF SUMMARY OF FIGURES

The figures do not reflect the actual proportions, but are intended to illustrate the principles of the various exemplary embodiments. In the following text various exemplary embodiments are described with reference to the following figures.

DETAILED DESCRIPTION

The following detailed description refers to the enclosed figures, which show details and exemplary embodiments.

These exemplary embodiments are described in sufficient detail to enable the person skilled in the art to embody the invention. Other embodiments are also possible, and the exemplary embodiments can be modified in terms of their structural, logical and electrical aspects without deviating from the subject matter of the invention. The different exemplary embodiments are not necessarily mutually exclusive, but different embodiments can be combined to create new embodiments. For the purposes of this description, the terms "connected" and "coupled" are used to describe both a direct and indirect connection, and a direct or indirect coupling.

Figure 1:
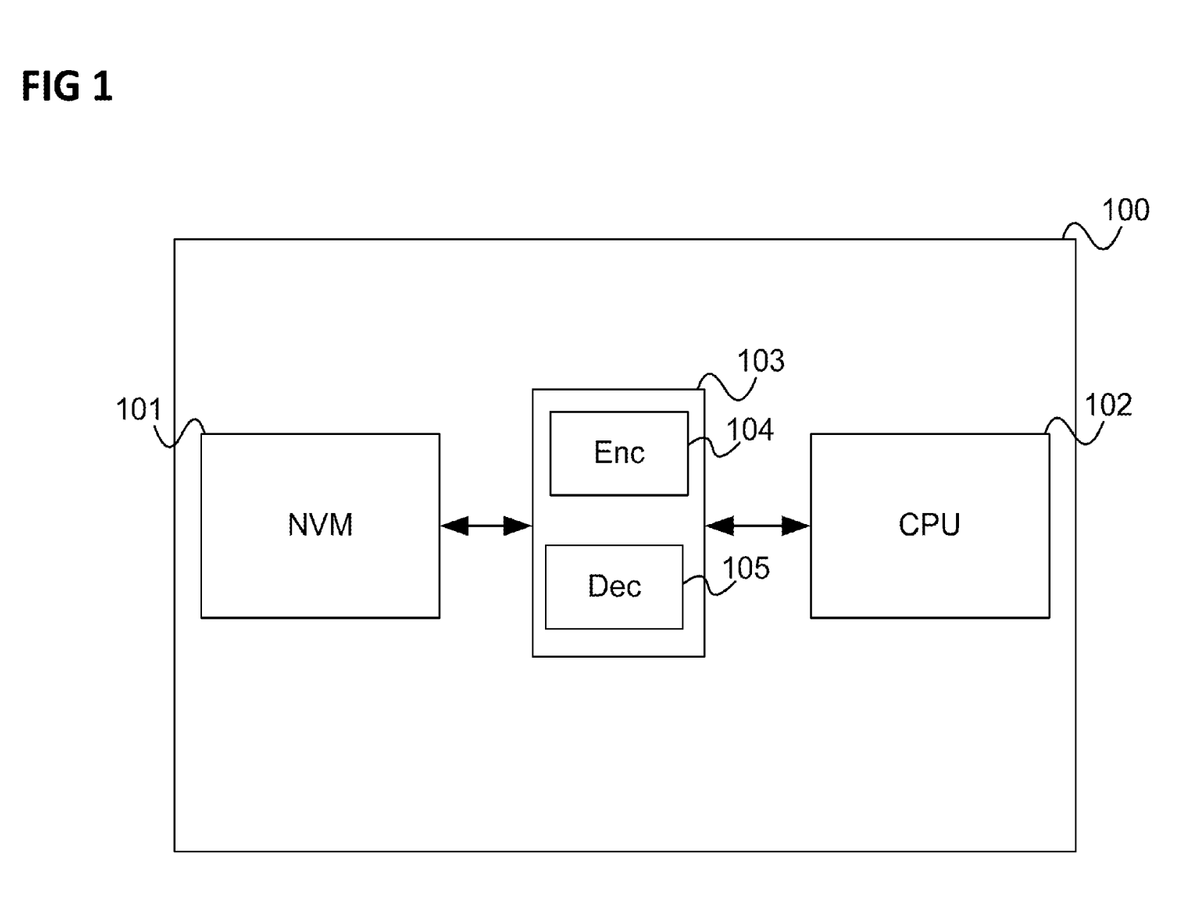
FIG. 1 shows an integrated security circuit with a non-volatile memory.

FIG. 1 shows an integrated security circuit (security IC) 100 with a non-volatile memory 101.

The security IC 100 has a microprocessor 102 that can access the non-volatile memory 101 and process data stored therein. For this purpose, a mechanism is provided that detects bit errors in the stored data and corrects them. According to various embodiments, a hardware circuit 103 is provided, which implements an error detection and error correction mechanism in hardware. The circuit 103 implements an encoder 104, which encodes data (in the form of data words, e.g. (bus) messages) to be stored in the memory 101, i.e. for a data word to be stored an associated code word is determined according to a specified code, which is then stored in the memory 101. This encoding adds redundancy information to the user information (data word to be stored). For readout, the memory implements a decoder 105, which determines for a memory word whether it is a valid code word according to the specified code or whether it is not a valid code word and therefore contains errors. Depending on the number of errors and the number of errors that can be corrected according to the code, the decoder 105 corrects the memory word to a valid code word. The decoder 105 delivers the valid code word to the microprocessor 102.

For example, the security IC 100 can be part of a control device (e.g. in a vehicle) or part of a chip card (with any form factor).

For example, EEPROM, Flash memory, FeRAM or an RRAM (resistive random access memory) can be used for the non-volatile memory 101.

However, the use of RRAM as a non-volatile memory 101 in security integrated circuits 100 places high demands on the mechanism used for detecting and correcting bit errors in the stored data. For safe operation of the memory 101 it is therefore desirable to use an error correction code (ECC), which can efficiently detect and correct multiple bit errors (for example, all 1 to 3-bit errors). This means that the minimum distance of the code used must be relatively large (at least 7 for correcting 3-bit errors). Because the number of error cases to be corrected in such a code is too large to tabulate all the associated syndromes or to decode and process them in parallel in hardware, the use of cyclic algebraic codes such as BCH or Reed-Solomon codes is an appropriate choice for this use case. The coding of data (or messages) to be stored and the decoding and error correction of read data (or messages) can then be described by means of calculations in a polynomial ring over a finite field, and according to one exemplary embodiment is carried out automatically by the hardware of the security IC 100, e.g. by the hardware circuit 103.

Cyclic algebraic codes for error correction, such as BCH codes, are defined over finite extension fields $GF(p^n)$ with p a prime number. During decoding of an error-containing data set, it is usually necessary to determine the zero points of the error polynomial, to calculate discrete logarithms of field elements for determining the error positions and calculate Zech logarithms for the efficient implementation of the addition of field elements in logarithmic representation. For this purpose, the function values of the functions used (e.g. polynomial functions, logarithm, Zech logarithm, exponential function) can be pre-calculated and stored as a table. A zero point of a (normalized) polynomial, the Zech logarithm or the discrete logarithm of a field element can then be simply obtained by means of table lookups.

Figure 2:
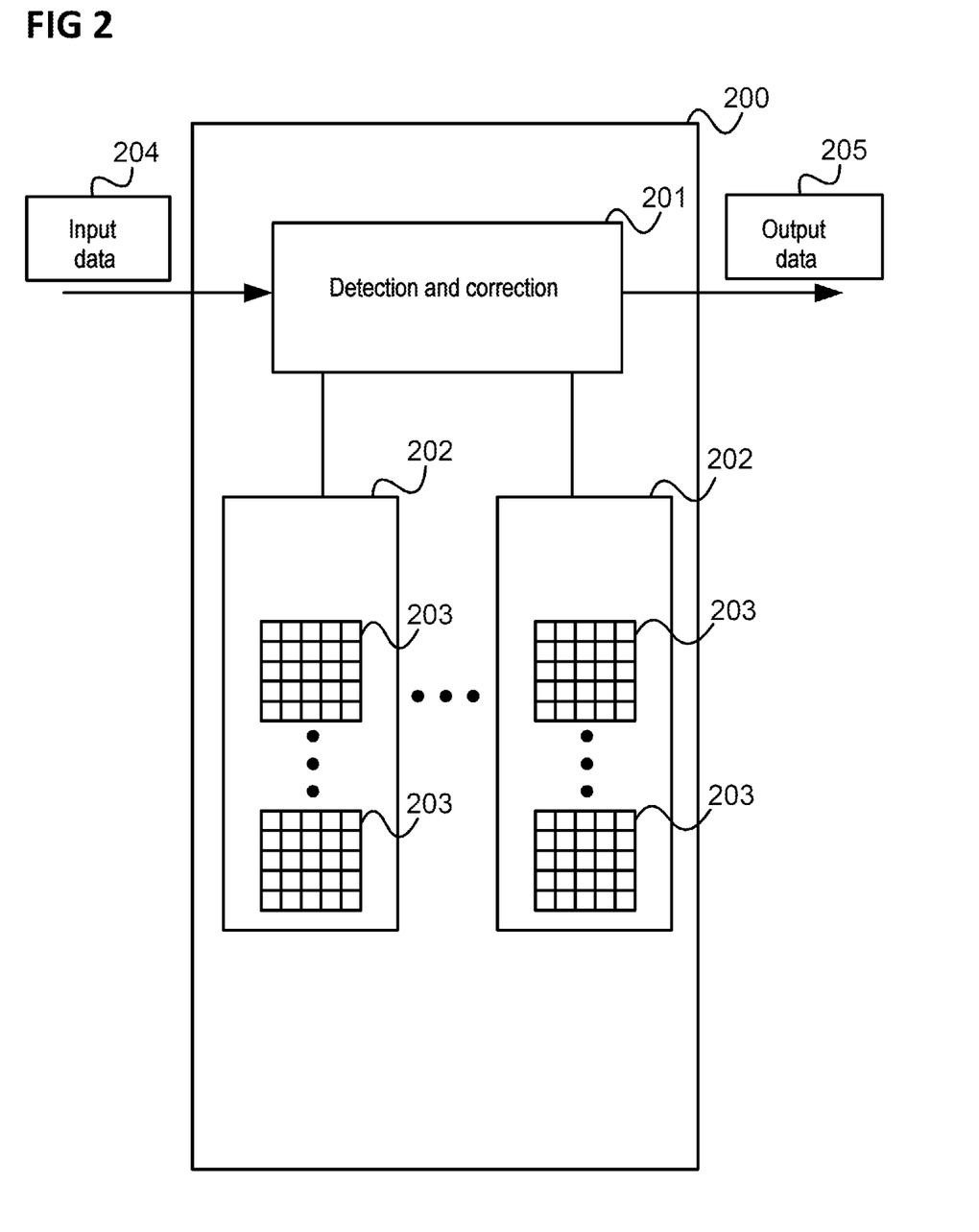
FIG. 2 illustrates a decoder circuit.

FIG. 2 illustrates a decoder circuit 200.

For example, the decoder circuit 200 corresponds to the decoder part 105 of the hardware circuit 103.

The decoder circuit 200 receives input data 204 (e.g. read from a memory or received as a message via a communication channel) which may contain errors.

The decoder circuit 200 has an error detection and error correction circuit 201, which detects whether the input data 204 contains errors and (where possible) corrects errors. For this purpose, it makes use of redundancy information, which is contained in the input data 204 in addition to the actual user information (or is represented by the input data).

The decoder circuit 200 then outputs output data 205, which corresponds, for example, to the user information without correction if the input data 204 is error-free, or corresponds to the user information after error correction, or else contains the information that the input data 204 is subject to errors but cannot be corrected (because too many errors are present).

The error detection and error correction circuit 201 performs the error detection and (if necessary) error correction according to an algebraic code. This is based on the assumption that the original user information was encoded according to this algebraic code to generate an original error-free code word which is now present as (possibly error-prone) input data 204. For example, the encoder 104 has encoded the user information according to the algebraic code before saving it to the memory 101 and the input data 204 corresponds to this coded user information after being read from the memory, but it may contain errors due to memory or processing errors, or else due to an attack.

The algebraic code is defined over a finite field GF(p'') where p is prime. For the calculations carried out by the error detection and error correction circuit 201, such as syndrome calculation, and subsequent error correction calculations, such as the calculation of an error-locator polynomial, the error detection and error correction circuit 201 relies on function circuits 202, which each calculate the function value for an input field element (i.e. an element of the finite field) of a function (logarithm, polynomial function) or an input natural number (exponential function, Zech logarithm). The function value can be a field element (for the polynomial function or for the exponential function) or a natural number (for the Zech logarithm or for the logarithm).

For an efficient implementation of this, the function values can be pre-calculated and stored in tables 203. As explained in more detail in the exemplary embodiments below, a function circuit 202 can use a plurality of tables 203.

Algebraic properties of the finite extension fields used can now be used to reduce the required size of tables 203: if the calculated function and the representation of the field elements or natural numbers for which the function is calculated have certain properties, the number of function values to be stored can be reduced to approximately 1/n of the fully tabulated function. However, the necessary transformations are generally so complex that this approach is typically only of practical use for software implementations of decoders.

The following text describes embodiments that enable a hardware implementation of pre-calculated functions based on table lookups and can be efficiently implemented and executed. In particular, the table size can almost be reduced to that of a corresponding software implementation.

The following examples assume that the function value of a field element is to be calculated (e.g., a polynomial function). However, the examples can be applied in completely the same way to the calculation of a function value of a natural number (the function value of which is then a field element). The application to such functions (Zech logarithm and exponential function) is explained in more detail below.

One embodiment uses the fact that, if the function to be calculated and the representation of the field elements (for which the function is to be calculated) have certain properties, for example an invariance or an inversion under application of the Frobenius endomorphism $x \rightarrow x^p$, it is sufficient to store only one representative for each orbit of the Frobenius endomorphism in the table. Orbit here means the orbit of the group of the powers of the Frobenius endomorphism for the field element x.

By this method, the number of function values to be stored can be reduced to approximately 1/n of the fully tabulated function. Here, n is the order of the Frobenius endomorphism for the field Gf(p'').

According to one embodiment, a function circuit 202 for calculating a function for a field element proceeds by first mapping the representation of the field element onto the unique representative of the orbit by repeated application of the Frobenius endomorphism, using table lookup in the corresponding table 203, then determining the mapped value (i.e. the function value) of the representative according to the tabulated function, and finally computing the mapped value of the original field element by repeated application of the inverse Frobenius endomorphism.

This approach can be based on an ordering of the representation of the field elements which defines the tabulated representatives of the orbit of Frobenius endomorphism. With this preselection of a representative (as the first step in optimizing the implementation) it is therefore possible to ensure that the corresponding table only needs to be sparsely filled. Then, in general, only one n-th of all table entries is needed, since most of the orbits of the Frobenius endomorphism have the length n.

In addition, in order to be able to store the sparsely filled table in a compact way, according to various embodiments a mechanism is additionally provided for mapping the unique representatives to a smaller address space, as described below.

Alternatively, the populated entries in the table could be implemented in a more compact way by hardware synthesis. However, it is not necessarily guaranteed that this method will actually achieve the space savings of a factor n.

According to the exemplary embodiments described in the following, the calculation of a unique representative of an orbit, e.g. a smallest element under lexicographic ordering, is also avoided, since this is comparatively expensive in hardware.

In the exemplary embodiments described below, a function circuit 202, which is designed to calculate a function value for a field element, determines one or more representatives of a particular orbit (to which the field element belongs) that have a specific bit pattern in the field element representation. In this context, a bit pattern is understood to mean a subset of (not necessarily consecutive) bit positions of the field element representation of the representative, together with one predefined bit value for each position.

If an orbit has such a representative, then the function circuit 202 can determine the corresponding function value by means of table lookup in a table 203 belonging to the bit pattern. Since the specified bits of the bit patterns are known and constant, they do not need to be considered as input in the table lookup, and the table 203 can be made smaller as a result. The more bit positions the specified bit pattern has, the more bits can be ignored in the corresponding table 203 and the smaller its size can be.

Because it is generally not possible to find a single bit pattern which occurs in at least one representative of each orbit, the implementation generally requires a (smallest possible) set of bit patterns. The set of bit patterns is selected in such a way that in each orbit there is one representative that has one of the bit patterns. However, it is not necessarily the case that the assignment of orbits to bit patterns described in this way is unique. It may quite possibly be the case that multiple representatives with one or even more bit patterns appear in an orbit in their field-element representation.

For a given set of bit patterns, it is very simple and efficient to check in hardware whether a given data item (field element in binary field-element representation) has at least one of the representative bit patterns. The associated circuits for testing for bit patterns can be implemented in logarithmic depth (in the number of bit positions to be tested), and tests for different patterns can be performed in parallel.

Figure 3:
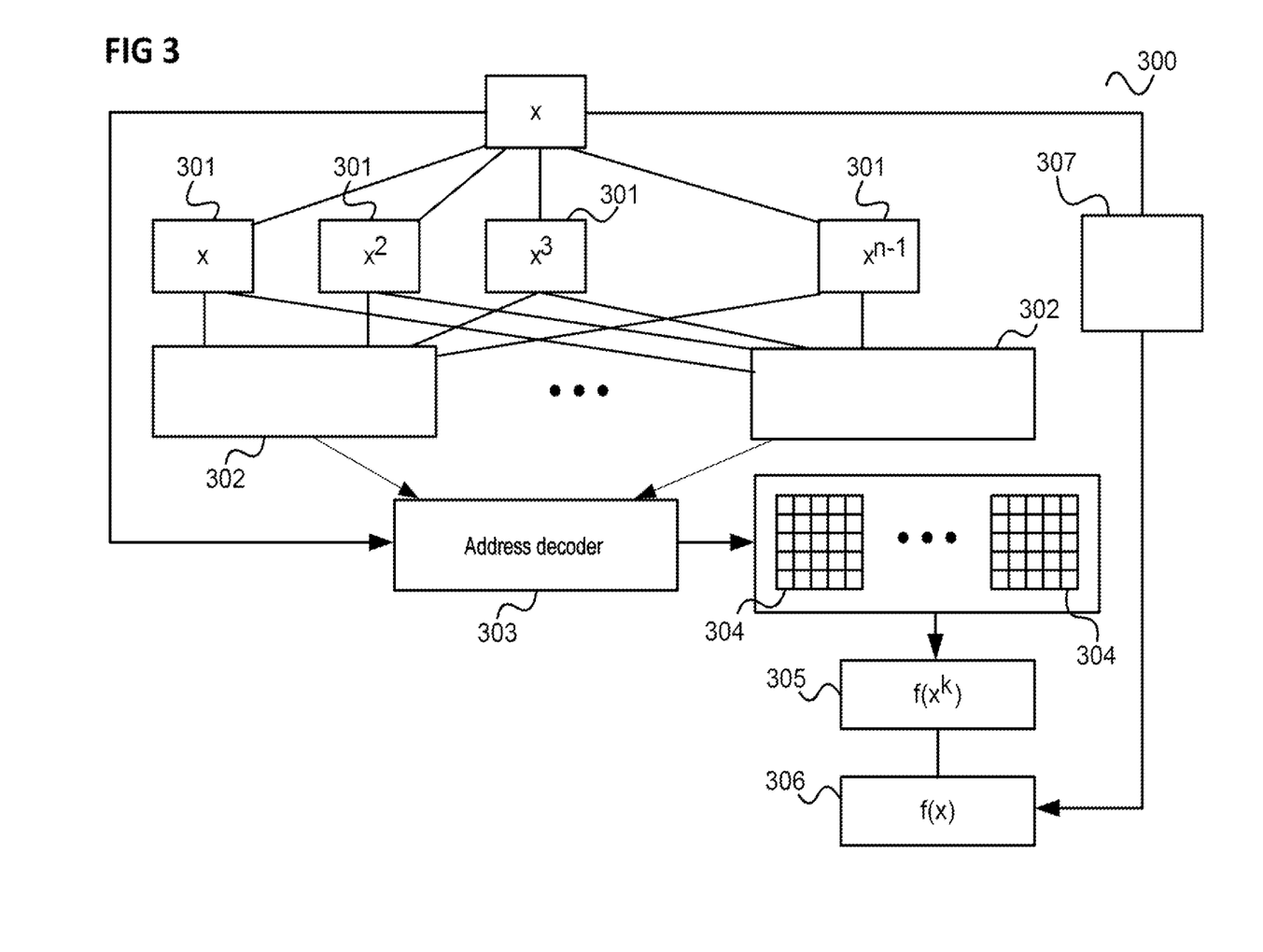
FIG. 3 shows a function circuit.

FIG. 3 shows a function circuit 300.

A field element x for which a function value is to be calculated is fed to the function circuit 300 in a (binary) field-element representation. In this example, the field-element representation is a normal base representation of $GF(2^n)$. This means that the field element is represented as a sequence of binary coefficients (elements from $GF(2)$), which are the coefficients of the "base vectors" of the normal base of the $GF(2)$ vector space $GF(2^n)$ to form the field element.

The application of the Frobenius automorphism to the field element then corresponds to a bitwise rotation of the binary field-element representation.

Accordingly, the function circuit 300 generates the orbit of the field element by generating all possible rotations 301 of the field element. This can be implemented in each case by simple wiring, which changes the arrangement of the coefficients of the field element according to the respective rotation.

A pattern matching circuit 302 is provided for each representative bit pattern. The function circuit 300 feeds each rotation 301 of the field element to each pattern matching circuit 302.

Each pattern matching circuit 302 determines for each rotation 301 whether the corresponding representative bit pattern is included in the rotation 301. For this purpose, the pattern matching circuit 302 can have an AND tree for each rotation 301, for example, which is compared with the respective representative bit pattern.

The bit pattern for which a representative was found in the orbit together with the remaining bits of the representative (except those of the bit pattern) are fed to an address decoder 303, which determines the function value of the representative 305 by means of table lookup in a table 304 assigned to the bit pattern at a position in the table 304 assigned to the remaining bits of the representative.

The representatives can then be easily mapped to a small address space in the tables 304. The bit positions associated with a detected bit pattern are removed (they specify the table which is used for the look-up), and the remaining bits address the (possibly sparsely populated) table for the function values of the representatives.

If the function to be calculated is inverted with the Frobenius automorphism, the function value of the field element 306 can be generated by reverse rotation (e.g. by selecting an appropriate wiring). If the function to be calculated is invariant under the Frobenius automorphism, such a reverse rotation is not necessary.

As a simple example, assume there is a function on the set of bytes that is invariant under the rotation R of the binary byte representation. (The bitwise rotation corresponds in this case to the Frobenius endomorphism in a finite extension field $GF(2^8)$ with normal base representation.) Under the rotation mapping, the set of 256 bytes breaks down into 36 pairwise disjoint orbits as follows:

There are 2 orbits of length 1:
  because there are two elements 0x00 and 0xff, each of which has an orbit of length 1
  because $R(0x00)=0x00$ and $R(0xff)=0xff$.
There is one orbit of length 2:
  because there are two other elements that are invariant under $R^2$. These are 0x55 and 0xaa.
  NB: there are $4=2^2$ elements that are invariant under $R^2$.
There are $3=(2^4-2^2)/4$ orbits of length 4:
  because there are $(2^4)$ elements that are invariant under $R^4$. This also includes the $2^2$ elements already mentioned above. Thus there are exactly $(2^4-2^2)$ elements that have order 4 under R.
There are $30=(2^8-2^4)/8$ orbits of length 8:
  because there are $(2^8)$ elements that are invariant under $R^8$. This is a trivial fact. This also includes the $2^4$ elements mentioned above. Thus there are exactly $(2^8-2^4)$ elements that have order 8 under R.

(The lexicographically smallest representatives of the 36 pairwise disjoint orbits are also called Lyndon words in the literature.)

This means that for the evaluation of the function it would be sufficient to know the values of the function on 36 representatives of the pairwise disjoint orbits. Thus, when the function is tabulated, a saving of a factor of 256/36=7.11 can be achieved, i.e. almost the factor n=8 as mentioned above.

If the implementation of such a table is performed by hardware synthesis, this savings factor is also approximately achieved. According to one embodiment, invariances or reversibility of a function with a mapping (e.g. the Frobenius automorphism) are in fact used to save space in a hardware implementation. Therefore, according to one embodiment, ROM tables 203, 304 are used for the implementation. These can be implemented in a very compact way in hardware.

A ROM table typically has a linear address space of size $2^m$, which is dependent on m address bits. In the example above, if a representative is selected from each of the 36 orbits, these are distributed over the entire interval [0, 255], so that an address space with less than 8 bits would not be sufficient. However, as mentioned above, the representatives can also be mapped onto a smaller address space.

In the example above, for example, the value of the function of 0xff is implemented as a special case (the prefix "0x" indicates a hexadecimal number). This allows at least one representative to be found in each remaining orbit, in which the highest bit is the 0. Thus, the values of the remaining 35 representatives can be accommodated in an address space with 7 address bits, which reduces the table size by half.

The value of the function of 0x00 can also be treated as another special case and the observation can be used that any value other than 0x00 and 0xff can be rotated so that the highest bits are equal to 01. This allows the tables 203, 304 for the remaining representatives selected in this way to be reduced to an address space with 6 address bits. Apart from the two special cases, the tables 203, 304 now only have ¼ of the original table size.

For handling the special cases 0x00 and 0xff, a circuit 307 can be provided in the circuit 300, for example, which compares the field element with the two special cases (e.g. by a bitwise XOR) and, if a special case applies, outputs the respective (e.g. hard-wired) function value.

Formulated more generally, according to one embodiment, a function circuit 202 is provided which implements a method for determining a function value f(x) for elements x, which can be represented by the bit strings $\{0,1\}^n$ of length n. The elements x can be field elements but also natural numbers.

The function f has the following property: there are two functions $\varphi$, $\rho$, so that the following applies:

$\rho(f(\varphi(x)))=f(x)$, for all $x$ from the definition set.

In this case, it is said that the function f is equivariant under the transformations $\varphi$ and $\rho^{-1}$.

An example (which is also the basis of the description of FIG. 3) is that $\varphi$ is the Frobenius endomorphism and $\varphi^{-1}=\rho$. For example, the function f is then any polynomial function.

Depending on the functions f, $\varphi$, $\rho$, a set of bit patterns $\{B_1, \ldots, B_r\}$ (consisting of bit positions and associated bit values) and associated tables (corresponding to the tables 203 of the function circuit 202) is defined for the function circuit 202.

The function circuit 202 is configured to determine the function value in the following steps:
  finding at least one bit pattern in the elements of the orbit of x: $\{x=\varphi^0(x), \varphi^1(x), \varphi^2(x), \ldots\}$.
  selecting a representative of the orbit $y=\varphi^k(x)$ which has one of the bit patterns $B_i$. (The bit pattern in this case has a length w.)
  table lookup of $z=f(y)$ in the table $T_i$ belonging to $B_i$ (The table uses a maximum of $2^{n-w}$ entries.)
  Determination of the function value $f(x)=\rho^k(z)$ by k-fold application of the function $\rho$.
  Typical special cases are:
  $\rho$ is the identity function, i.e., f is invariant under $\varphi$.
  A bit pattern has the length w=n (see above example for $GF(2^8)$ and the Frobenius automorphism. Then the associated table consists of only one value.

For an exemplary embodiment which is described with reference to the circuit 300 of FIG. 3, in the following the extension field $GF(2^9)$ is considered. Let the elements of the field be represented as bit strings $\{0,1\}^9$ of length 9 with respect to a normal base. Then the Frobenius endomorphism $\varphi: x \to x^2$ (as described with reference to FIG. 3) can be implemented by rotating the bit strings one position to the left. The set of 512 bit strings breaks down into 60 pairwise disjoint orbits: 2 orbits of length 1 (generated by the elements 000000000 and 111111111), 2 orbits of length 3 (generated by the elements 001001001 and 011011011) and 56 orbits of length 9. For this reason, at least 60 function values must be pre-stored (e.g. tabulated) in order to be able to determine a function value based on a pre-stored function value for each possible entry value (also referred to as input value).

With the 4 bit patterns B={111111111,***0001, 0*0**00, *01***1*1} at least one representative with respect to rotation can be found for each of the 512 possible bit strings of length 9. The notation * means that the value of the corresponding bit is not taken into account by the respective pattern matcher 302. For the circuit therefore, a bit pattern of length 9 (corresponding to a single table entry) and 3 bit patterns of length 4 (each corresponding to 32 table entries for the possible bit values at the positions marked with *) are defined. This means that 1+3*32=97 function values must be stored as pre-calculated function values (e.g. as table entries in the tables 304). The individual value for the bit pattern 111111111 can also be stored outside a table, e.g. hard-wired in the circuit 307.

In another design variant, the number of table entries can be further reduced if the function values are not stored as tables 304 but implemented by synthesized logic circuits. The 4 bit patterns B have the property that multiple bit patterns can occur in an orbit of 32 bit strings.

For example, after application $\varphi^5(100010110)$ =011010001, bit string 100010110 has the bit pattern *****0001 and after application $\varphi^7(100010110)$ =101000101 it has the bit pattern *01***1*1. The orbit of 100010110 thus has both bit patterns, i.e. both bit patterns match the orbit.

If the circuit 300 then tests the bit patterns for a given bit string x in a fixed order (for example 111111111→***0001→0*0**00→*01***1*1) and if in the function evaluation it selects the first pattern in each case with a representative in the orbit of x, then the 32 bit strings, which several bit patterns from B match, need only be synthesized once as a function value in one of the three tables (i.e. only for the first matching bit pattern).

This means that the number of values required to tabulate a function is 65. (For comparison: a table without a reduction procedure has 512 entries, the minimum number of entries is 60.) The bit patterns B in this case were selected such that the number of bit strings that match multiple bit patterns from B (for patterns with a length of 9 and three sets of 4 bits) is a maximum.

As mentioned above, the above approach is not limited to calculating function values of field elements, but can also be applied to calculating function values for natural numbers. A natural number can represent a field element as its logarithm (in relation to a primitive element of the field). Thus, the calculation of a function value for a natural number can be considered as an application of the above approach to the hardware-efficient calculation of tabulated functions over finite extension fields to the representation of field elements in logarithmic form.

For example, let the elements of the field $GF(2^9)$ be represented as bit strings $\{0,1\}^9$ of length 9 with respect to a primitive normal base with generating element $\alpha$. All of 0 different field elements $x \in GF(2^9)$ can then be uniquely represented by their discrete logarithm $0 \leq d<511$ with respect to $\alpha$, and $x=\alpha^d$ is true.

The discrete logarithm d here is a natural number and the Frobenius endomorphism in this representation corresponds to a doubling modulo 511: that is, x→2x modulo 511. In this number representation, the effect of $\varphi$ on a number represented as a binary discrete logarithm is a rotation one position to the left, and $\rho$ causes a rotation one position to the right.

Accordingly, similarly to a circuit with a field element as input and a field element as output (e.g. a polynomial function), circuits can also be provided in which the input, the output or both natural numbers are modulo $2^n-1$.

Examples of this are the discrete logarithm function with respect to a, the modular exponential function with respect to base a, and the Zech logarithm.

Since if $Z(x)=\log(\alpha^x+1)$ is the discrete Zech logarithm (where x is a natural number), then the following applies $$Z(2x)=\log((\alpha^x)^2+1)=\log((\alpha^x+1)^2)$$

due to the isomorphism property of the Frobenius automorphism and therefore $$Z(2x)=2\log(\alpha^x+1)=2Z(x)$$

(2x is calculated modulo $2^n-1$).

Thus, the Zech logarithm again inverts with the rotation (i.e. doubling or halving). Analogous to the calculation of a polynomial function for a field element, the Zech logarithm can thus be determined by rotation of the input value (natural number) to an orbit representative, determination of the Zech logarithm (by table lookup) of the orbit representative and reverse rotation of the result (natural number).

The same applies to the logarithm and the exponential function.

Figure 4:
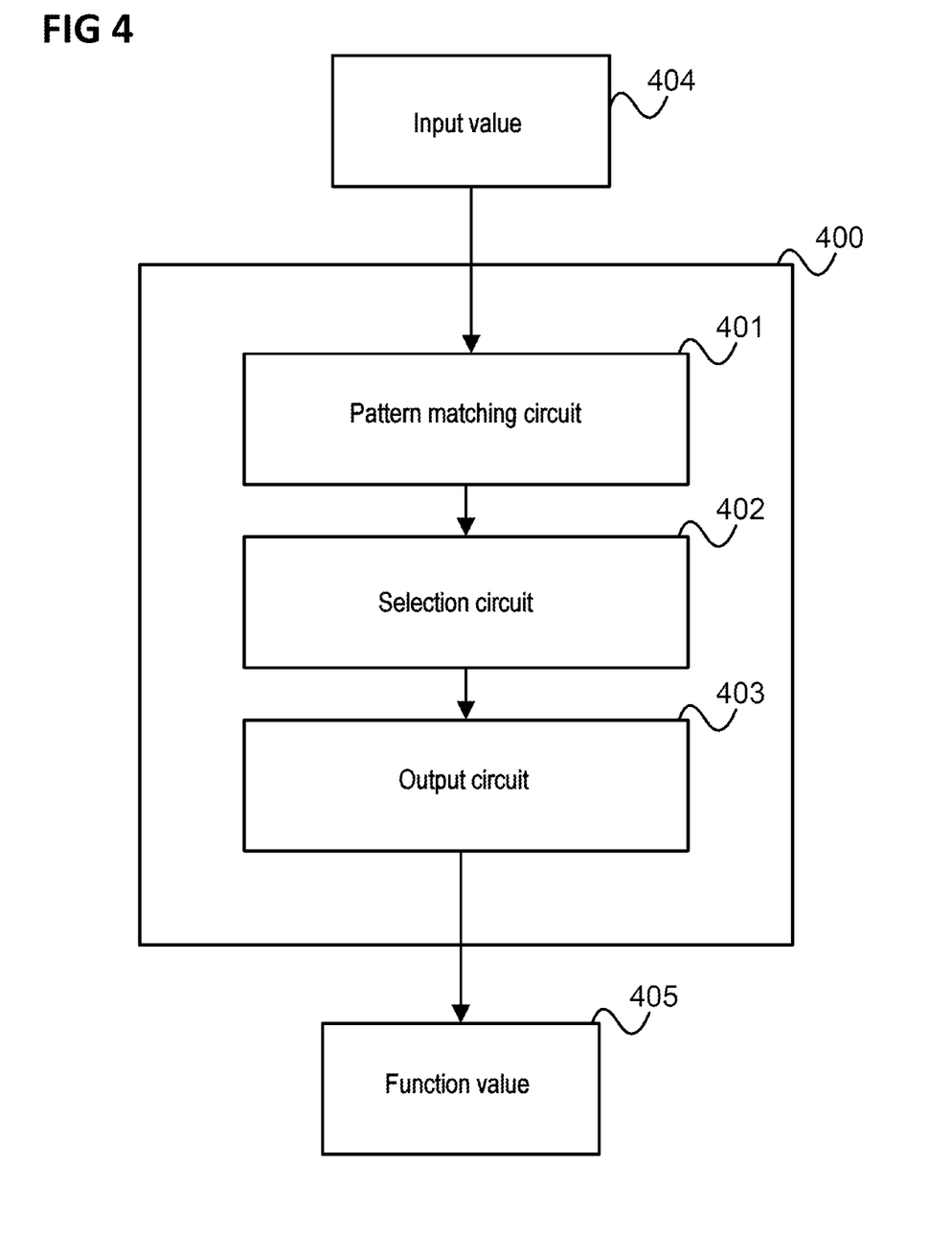
FIG. 4 shows an integrated circuit for calculating a function value of a function for an input value.

In summary, according to various embodiments an integrated circuit as shown in FIG. 4 is provided.

FIG. 4 shows an integrated circuit 400 for calculating a function value 405 of a function for an input value 404.

The integrated circuit 400 has a pattern matching circuit 401 which is configured to compare the input value and multiple transformed versions of the input value with a specified bit pattern and/or to compare the input value with the bit pattern and multiple transformed versions of the specified bit pattern, wherein the transformed versions of the input value or the specified bit pattern are created by repeated application of a transformation to the input value or the specified bit pattern, wherein the function is invariant under the transformation or wherein an inverse transformation exists for the transformation, by means of which a change in the function values that is caused by the transformation of the input values can be reversed.

The integrated circuit 400 also has a selection circuit 402 which is configured to select a function value depending on the comparison result of the pattern matching circuit and the input value.

The integrated circuit 400 also has an output circuit 403 which is configured to output a function value 405 for the input value 404 based on the selected function value.

In other words, to determine a function value of a function for an entry value (or input value) the integrated circuit generates a set of transformed versions of the input value, i.e. the orbit of the input value for repeated application of the mapping (e.g. repeated rotation), or similarly transformed versions of the bit pattern. The circuit then searches for the specified bit pattern in the orbit of the input value by pattern matching, or searches for the bit pattern and the transformed versions of the bit pattern in the input value. The circuit thus identifies a representative of an orbit for which it has the stored function value. The output circuit takes this stored function value as a basis for the function value of the input value.

If the function is invariant under the transformation, the output circuit can use the stored function value. Otherwise, it calculates the function value for the input value by applying the inverse transformation to the stored function value in order to compensate for the transformation of the input value that led to the representative of the orbit.

The transformation of the input value can be viewed as a mapping under which the function is invariant or for which there is an inverse mapping, so that the inversely mapped function value of a mapped input value is equal to the function value of the input value.

The expansion circuit can generate the different versions of the input value by rearranging the bits of the input value, e.g. by a (e.g. hard-wired) permutation of the bits of the input value.

The integrated circuit (or a plurality of such integrated circuits that provide function values for different functions) can be used by a decoder circuit, for example. This can be implemented in hardware, i.e. it can be configured to work without a programmable processor, or, in other words, it is hard-wired.

In the following text, various exemplary embodiments are specified.

Exemplary embodiment 1 is an integrated circuit for outputting a function value of a function for an input value, as shown in FIG. 4.

Exemplary embodiment 2 is an integrated circuit according to exemplary embodiment 1, wherein the comparison result of the pattern matching circuit indicates the minimum number of times the transformation must be applied to the input value to obtain a value that contains the bit pattern, or the minimum number of times the transformation must be applied to the bit pattern to obtain a value that the input value contains.

Exemplary embodiment 3 is an integrated circuit according to exemplary embodiment 1 or 2, wherein the pattern matching circuit is configured to compare the input value and multiple transformed versions of the input value with the specified bit pattern, and the selection circuit is configured to select the function value which is pre-stored for a bit string that corresponds to the value having the specified bit pattern among the input value and the transformed versions of the input value.

Exemplary embodiment 4 is an integrated circuit according to exemplary embodiment 3, including an expansion circuit which is configured to generate the multiple transformed versions of the input value by repeated application of the transformation to the input value.

Exemplary embodiment 5 is an integrated circuit according to exemplary embodiment 1 or 2, wherein the pattern matching circuit is configured to compare the input value with the bit pattern and multiple transformed versions of the specified bit pattern, and wherein the selection circuit is configured to provide a transformed input value that is transformed so as to contain the bit pattern, and to select the function value using the transformed input value.

Exemplary embodiment 6 is an integrated circuit according to exemplary embodiment 5, wherein the selection circuit is configured to provide the transformed input value depending on the minimum number of times the transformation must be applied to the bit pattern in order to obtain a value that the input value contains.

Exemplary embodiment 7 is an integrated circuit according to exemplary embodiment 5 or 6, wherein the selection circuit is configured to provide the transformed input value in such a way that it is derived from the application of the inverse of the transformation to the input value the minimum number of times that the transform must be applied to the bit pattern to obtain a value that the input value contains.

Exemplary embodiment 8 is an integrated circuit according to any one of exemplary embodiments 5 to 7, wherein the selection circuit is configured to select a function value which is pre-stored for a bit string that corresponds to the transformed input value.

Exemplary embodiment 9 is an integrated circuit according to any one of exemplary embodiments 1 to 8, including a memory circuit which is configured to store a pre-calculated function value for a plurality of bit strings, the selection circuit being configured to select the function value by accessing the memory circuit.

Exemplary embodiment 10 is an integrated circuit according to exemplary embodiment 9, wherein the memory circuit is a non-volatile memory or a volatile memory.

Exemplary embodiment 11 is an integrated circuit according to exemplary embodiment 9, wherein the memory circuit is a ROM storage table or wherein the memory circuit is a logic circuit.

Exemplary embodiment 12 is an integrated circuit according to any one of exemplary embodiments 1 to 11, wherein the output circuit is configured to output the selected function value as a function value for the input value if the function is invariant under the transformation.

Exemplary embodiment 13 is an integrated circuit according to any one of exemplary embodiments 1 to 12, wherein the output circuit is configured to determine a function value for the input value by applying the inverse transformation to the selected function value, if the bit pattern is not contained in the input value itself.

Exemplary embodiment 14 is an integrated circuit according to exemplary embodiment 13, wherein the output circuit is configured to apply the inverse transformation to the selected function value the same number of times as the transformation is applied to the input value to generate a transformed version of the input value that contains the bit pattern, if the bit pattern is not contained in the input value itself.

Exemplary embodiment 15 is an integrated circuit according to any one of exemplary embodiments 1 to 14, wherein the transformation and the inverse transformation are bit-wise rotations.

Exemplary embodiment 16 is an integrated circuit according to any one of exemplary embodiments 1 to 15, wherein the function is invariant or equivariant under the transformation.

Exemplary embodiment 17 is an integrated circuit according to any one of exemplary embodiments 1 to 16, wherein the input value and/or the function value is a representation of a field element of a finite field.

Exemplary embodiment 18 is an integrated circuit according to exemplary embodiment 17, wherein the function is a polynomial function, the Zech logarithm, the logarithm or the exponential function.

Exemplary embodiment 19 is an integrated circuit according to exemplary embodiment 17 or 18, wherein the field is a $GF(2^n)$ with n>1.

Exemplary embodiment 20 is an integrated circuit according to any one of exemplary embodiments 1 to 19, wherein the input value has a binary representation and the bit pattern is shorter than the binary representation of the input value.

Exemplary embodiment 21 is an integrated circuit according to any one of exemplary embodiments 1 to 20, including a plurality of memory circuits, wherein each memory circuit is assigned to one of the bit patterns and is configured to store a pre-calculated function value for a plurality of bit strings that have the bit pattern, the selection circuit being configured to select the function value by accessing one of the memory circuits.

Exemplary embodiment 22 is an integrated circuit according to exemplary embodiment 21, wherein the selection circuit is configured to select a memory circuit based on the bit pattern from the plurality of memory circuits and, on the basis of the remaining bits of the value that has the specified bit pattern, to select a function value stored by the selected memory circuit for the value.

Exemplary embodiment 23 is an integrated circuit according to any one of exemplary embodiments 1 to 22, including a detection circuit which is configured to check whether the input value is equal to a specified input value and wherein the output circuit is configured to output a specified function value if the input value is equal to the specified input value.

Example 24 is an integrated decoder circuit, including a receiver configured to receive a message word; one or more integrated circuits according to any one of the exemplary embodiments 1 to 23, an error detection and error correction circuit which is configured to detect, and if necessary correct, errors in the received message word using the function.

Exemplary embodiment 25 is an integrated decoder circuit according to exemplary embodiment 24, wherein the integrated decoder circuit has a plurality of integrated circuits according to any one of exemplary embodiments 1 to 23, wherein the integrated circuits are configured to output function values for different functions and wherein the error detection and error correction circuit is configured to detect, and if necessary correct, errors in the received message word using the functions.

Exemplary embodiment 26 is an integrated decoder circuit according to exemplary embodiment 24 or 25, wherein the receiver has a memory interface and is configured to read out the message word from a memory.

Exemplary embodiment 27 is an integrated decoder circuit according to any one of exemplary embodiments 24 to 26, wherein the error detection and error correction circuit is configured to detect, and if necessary correct, errors in the received message word according to a cyclic algebraic code.

Exemplary embodiment 28 is an integrated decoder circuit according to exemplary embodiment 27, wherein the code is a Reed-Solomon code or a BCH code.

Although the invention has mainly been shown and described by reference to specific embodiments, it should be understood by those familiar with the technical field that numerous changes can be made with regard to its design and details without departing from the nature and scope of the invention, as defined by the following claims. The scope of the invention is therefore defined by the attached claims and it is intended that any changes that fall within the literal meaning or equivalent scope of the claims are included.

LIST OF REFERENCE SIGNS 100 security circuit
101 non-volatile memory
102 microprocessor
103 hardware circuit
104 encoder
105 decoder
200 decoder circuit
201 error detection and error correction circuit
202 function circuits
203 tables
204 input data
205 output data
300 function circuit
301 field element rotations 302 pattern matching circuit
303 address decoder
304 tables
305 representative function value
306 field element function value
400 integrated circuit
401 expansion circuit
402 pattern matching circuit
403 selection circuit
404 output circuit
405 input value
406 function value

What is claimed is:

1. An integrated circuit for outputting a function value of a function for an input value, comprising:
   a pattern matching circuit that is configured to compare the input value and multiple transformed versions of the input value with a specified bit pattern and/or to compare the input value with the specified bit pattern and multiple transformed versions of the specified bit pattern;
   wherein the transformed versions of the input value or the specified bit pattern are created by repeated application of a transformation to the input value or the specified bit pattern;
   wherein the function is invariant under the transformation or wherein an inverse transformation exists for the transformation, by which a change in the function values that is caused by the transformation of the input values can be reversed;
   a selection circuit that is configured to select a function value depending on the comparison result of the pattern matching circuit and the input value; and
   an output circuit that is configured to output a function value for the input value based on the selected function value.

2. The integrated circuit of claim 1, wherein the comparison result of the pattern matching circuit indicates a minimum number of times the transformation must be applied to the input value to obtain a value that contains the specified bit pattern, or a minimum number of times the transformation must be applied to the specified bit pattern to obtain a value that the input value contains.

3. The integrated circuit of claim 1, wherein the pattern matching circuit is configured to compare the input value and multiple transformed versions of the input value with the specified bit pattern and the selection circuit is configured to select the function value which is pre-stored for a bit string that corresponds to the value having the specified bit pattern among the input value and the transformed versions of the input value.

4. The integrated circuit of claim 3, comprising an expansion circuit that is configured to generate the multiple transformed versions of the input value by repeated application of the transformation to the input value.

5. The integrated circuit of claim 1, wherein the pattern matching circuit is configured to compare the input value with the specified bit pattern and multiple transformed versions of the specified bit pattern, and wherein the selection circuit is configured to provide a transformed input value that is transformed so as to contain the specified bit pattern, and to select the function value using the transformed input value.

6. The integrated circuit of claim 5, wherein the selection circuit is configured to provide the transformed input value depending on the minimum number of times the transformation must be applied to the specified bit pattern in order to obtain a value that the input value contains.

7. The integrated circuit of claim 5, wherein the selection circuit is configured to provide the transformed input value in such a way that it is derived from the application of the inverse of the transformation to the input value the minimum number of times that the transform must be applied to the specified bit pattern to obtain a value that the input value contains.

8. The integrated circuit of claim 5, wherein the selection circuit is configured to select a function value that is pre-stored for a bit string that corresponds to the transformed input value.

9. The integrated circuit of claim 1, comprising a memory circuit which is configured to store a pre-calculated function value for a plurality of bit strings, the selection circuit being configured to select the function value by accessing the memory circuit.

10. The integrated circuit of claim 9, wherein the memory circuit is a non-volatile memory or a volatile memory.

11. The integrated circuit of claim 9, wherein the memory circuit is a ROM storage table or wherein the memory circuit is a logic circuit.

12. The integrated circuit of claim 1, wherein the output circuit is configured to output the selected function value as a function value for the input value if the function is invariant under the transformation.

13. The integrated circuit of claim 1, wherein the output circuit is configured to determine a function value for the input value by applying the inverse transformation to the selected function value, if the specified bit pattern is not contained in the input value itself.

14. The integrated circuit of claim 13, wherein the output circuit is configured to apply the inverse transformation to the selected function value the same number of times as the transformation is applied to the input value to generate a transformed version of the input value that contains the specified bit pattern, if the specified bit pattern is not contained in the input value itself.

15. The integrated circuit of claim 1, wherein the transformation and the inverse transformation are bitwise rotations.

16. The integrated circuit of claim 1, wherein the function is invariant or equivariant under the transformation.

17. The integrated circuit of claim 1, wherein the input value and/or the function value is a representation of a field element of a finite field.

18. The integrated circuit of claim 17, wherein the function is a polynomial function, a Zech logarithm, a logarithm or an exponential function.

19. The integrated circuit of claim 17, wherein the field is a $GF(2^n)$ with $n>1$.

20. The integrated circuit of claim 1, wherein the input value has a binary representation and the specified bit pattern is shorter than a binary representation of the input value.

21. The integrated circuit of claim 1, comprising a plurality of memory circuits, wherein each memory circuit is assigned to one of the specified bit patterns and is configured to store a pre-calculated function value for a plurality of bit strings that have the specified bit pattern, the selection circuit being configured to select the function value by accessing one of the memory circuits.

22. The integrated circuit of claim 21, wherein the selection circuit is configured to select a memory circuit based on the specified bit pattern from the plurality of memory circuits and, on the basis of the remaining bits of the value that has the specified bit pattern, to select a function value stored by the selected memory circuit for the value.

23. The integrated circuit of claim 1, further comprising a detection circuit that is configured to check whether the input value is equal to a specified input value and wherein the output circuit is configured to output a specified function value if the input value is equal to the specified input value.

24. An integrated decoder circuit, comprising:
a receiver configured for receiving a message word;
one or more integrated circuits as claimed in claim 1; and
an error detection and error correction circuit, which is configured to detect, and if necessary correct, errors in the received message word using the function.

25. The integrated decoder circuit of claim 24, wherein the integrated decoder circuit comprises a plurality of integrated circuits as claimed in claim 1; wherein the integrated circuits are configured to output function values for different functions, and wherein the error detection and error correction circuit is configured to detect and if necessary correct errors in the received message word using the functions.

26. The integrated decoder circuit of claim 24, wherein the receiver comprises a memory interface and is configured to read out the message word from a memory.

27. The integrated decoder circuit of claim 24, wherein the error detection and error correction circuit is configured to detect, and if necessary correct, errors in the received message word according to a cyclic algebraic code.

28. The integrated decoder circuit of claim 27, wherein the code is a Reed-Solomon code or a BCH code.

* * * * *